United States Patent [19]

Tingskog

[11] Patent Number: 5,465,830

[45] Date of Patent: Nov. 14, 1995

[54] CONVEYOR FOR LOADING AND UNLOADING MATERIAL WITHIN A VERY WIDE AREA, WHICH CONVEYOR INCLUDES A SINGLE ENDLESS BELT

[76] Inventor: Lennart Tingskog, Kattegattsgatan 23, S-253 71 Helsingborg, Sweden

[21] Appl. No.: 256,908

[22] PCT Filed: Feb. 12, 1993

[86] PCT No.: PCT/SE93/00112

§ 371 Date: Aug. 9, 1994

§ 102(e) Date: Aug. 9, 1994

[87] PCT Pub. No.: WO93/15983

PCT Pub. Date: Aug. 19, 1993

[30] Foreign Application Priority Data

Feb. 14, 1992 [SE] Sweden ................... 9200447

[51] Int. Cl.[6] ................... B65G 15/12
[52] U.S. Cl. ............ 198/819; 198/812; 414/142.2
[58] Field of Search .................. 198/812, 819, 198/585, 588; 414/140.9, 142.2

[56] References Cited

U.S. PATENT DOCUMENTS

| | | | |
|---|---|---|---|
| 4,565,285 | 1/1986 | Koistinen | 198/819 |
| 4,732,523 | 3/1988 | Antikainen et al. | 198/518 X |
| 5,060,787 | 10/1991 | Tingskog | 198/819 |
| 5,320,471 | 6/1994 | Gratgoff | 414/142.2 X |
| 5,351,810 | 10/1994 | Tingskog | 198/819 |

FOREIGN PATENT DOCUMENTS

| | | | |
|---|---|---|---|
| 1128361 | 4/1962 | Germany | |
| 0051221 | 3/1988 | Japan | 414/140.9 |
| 0172115 | 7/1989 | Japan | 198/819 |
| 92/12076 | 7/1992 | WIPO | |
| 93/08106 | 4/1993 | WIPO | |

*Primary Examiner*—James R. Bidwell

[57] ABSTRACT

A conveyor for feeding out or feeding in goods within an elongated area comprises a tower (1) movable along a path located at a long side of the elongated area, an arm (4, 5) mounted on the tower and having a free end (6) extending into the area, and a feed-out device or a feed-in device (7) mounted at the free end of the arm. The conveyor further comprises an endless conveyor belt (10) which is closed but can be opened for feeding out or feeding in the goods. Belt guides (11–13, 16, 19) guide the conveyor belt from a first terminal point of the path, along this up to the tower, up along the tower and out along the arm to the feed-out device or the feed-in device, back along the arm and the tower down to the path, further along this to the second terminal point, and in a return path back to the first terminal point. A feed-in or feed-out station (20, 21) is provided at one of the terminal points or at a point along the return path.

10 Claims, 4 Drawing Sheets

CONVEYOR FOR LOADING AND UNLOADING MATERIAL WITHIN A VERY WIDE AREA, WHICH CONVEYOR INCLUDES A SINGLE ENDLESS BELT

FIELD OF THE INVENTION

The present invention relates to a conveyor for feeding out or feeding in goods within an elongated area, said conveyor comprising a tower movable along a path located at a long side of the elongated area, an arm mounted on the tower and having a free end which extends into said area, and a feed-out device or a feed-in device mounted at the free end of the arm.

DESCRIPTION OF THE BACKGROUND ART

Conveyors of this type are, among other things, used for loading and unloading ships moored alongside the quay, in which case the elongated area is the ship's hold. Such conveyors are also used for conveying coal to and from coal depots, in which case the depot, of course, is the elongated area. In both instances, use is commonly made of a first conveyor for conveying the goods along a long side of the area, e.g. the quay, and from the first conveyor the goods is reloaded to a second conveyor which transports it up through the tower and out to the feed-out device located at the free end of arm. The reloading site then has to move together with the tower, which is difficult and involves the risk of dusting.

SUMMARY OF THE INVENTION

The object of the present invention is to obviate the inconveniences of reloading when conveying goods as described above.

According to the invention, this object is achieved by a conveyor which is of the above type and which is characterised by a single endless conveyor belt which is closed but can be opened for feeding out or feeding in the goods, belt-guiding means for guiding the conveyor belt from a first terminal point of the path, along this and up to the tower, up along the tower and out along the arm to the feed-out device or the feed-in device, back along the arm and the tower down to the path, further along this to the second terminal point thereof, and in a return path back to the first terminal point, and a feed-in or feed-out station arranged at one of the terminal points or at a point along the return path.

According to the invention, use is thus made of a single conveying belt operating along a long side of the area, thence along the tower and the arm to, and from, the free end of the arm. The reloading hitherto required has thus been completely eliminated.

When the tower is moved along the path, the belt on one side of the tower is thus lifted into the tower, while the belt on the other side of the tower is laid out from the tower. To perform this in the simplest possible manner, the belt-guiding means disposed along the path between the terminal points conveniently only comprise supporting rollers arranged beneath the conveyor belt. If the belt employed would need e.g. pressure rollers on the upper side to remain closed, it must be possible to remove the rollers to permit lifting the belt.

To drive the conveyor belt, use is conveniently made of a terminal roller at one or both of the terminal points of the path. The belt is thus not driven along the arm, for which reason the weight of the arm can be kept low.

The driving force required of the terminal roller or rollers varies according to the location of the tower along the path. In order to reduce this variation, a driven belt can be arranged in frictional contact with the conveyor belt in the area where this changes from moving up to the tower to moving up along the tower.

Further, adjusting means may be arranged to minimise the tractive forces acting on the belt by varying the distribution of the driving forces applied according to the position of the tower along the path. These adjusting means might also operate depending on other factors that may influence the distribution of tractive forces.

The conveyor belt employed is advantageously of the type described in U.S. Pat. No. 5,060,787, hereby incorporated by reference. When used for conveying certain types of goods, e.g. cement, the conveyor belt must be of the type described in WO 92/12076, hereby incorporated by reference.

A belt of the type described in PCT/SE92/00733, also incorporated by reference, is especially advantageous, requiring no pressure rollers to remain closed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will be described in more detail below with reference to the accompanying drawings which are given by way of illustration only, and thus are not limitative of the present invention, and, in which.

DETAILED DESCRIPTION OF THE PREFERRED EMBODIMENTS

Figure 3:
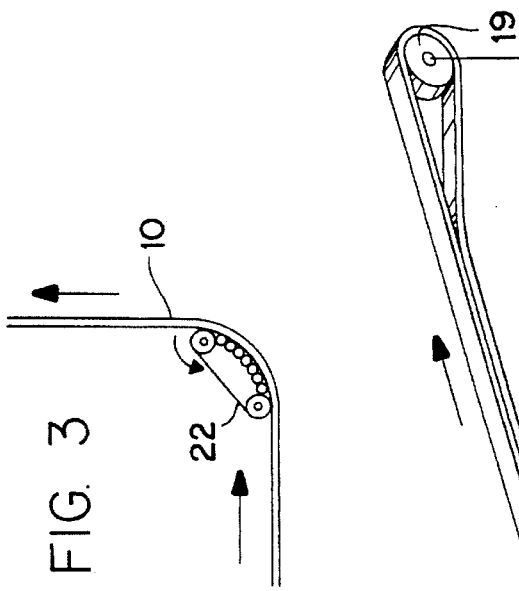
FIG. 3 is a side view illustrating a modification of the conveyor in FIG. 2.

The illustrated conveyor has a tower 1 which is mounted on wheels 2 so as to be able to move back and forth along a path, e.g. a quay.

The upper part 3 of the tower 1 is rotatable about the tower axis and supports an arm 4, 5 which is divided into two sections and which is pivotable in a vertical plane for placement of its outer free end 6 in an optional position within an elongated area located beside the above-mentioned path, e.g. at an optional point in the hold of a ship moored alongside the quay.

Figure 1:
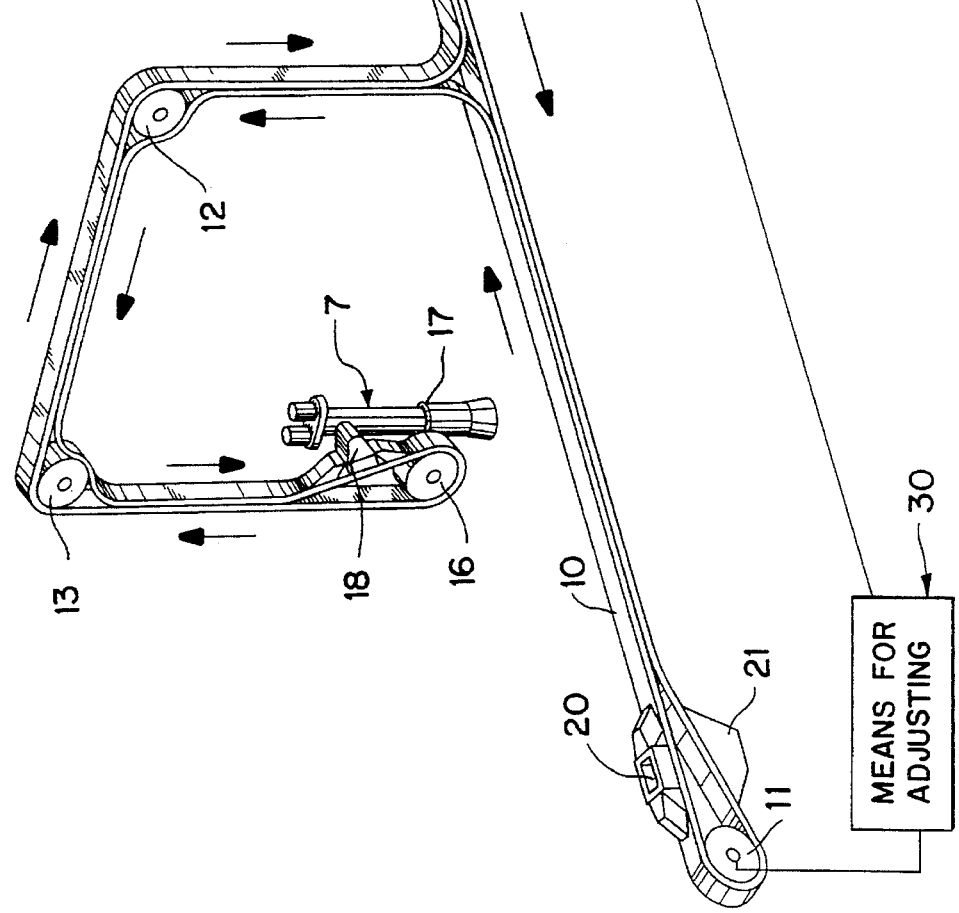
FIG. 1 is a schematic perspective view showing how the belt travels in a conveyor according the invention.
Figure 2:
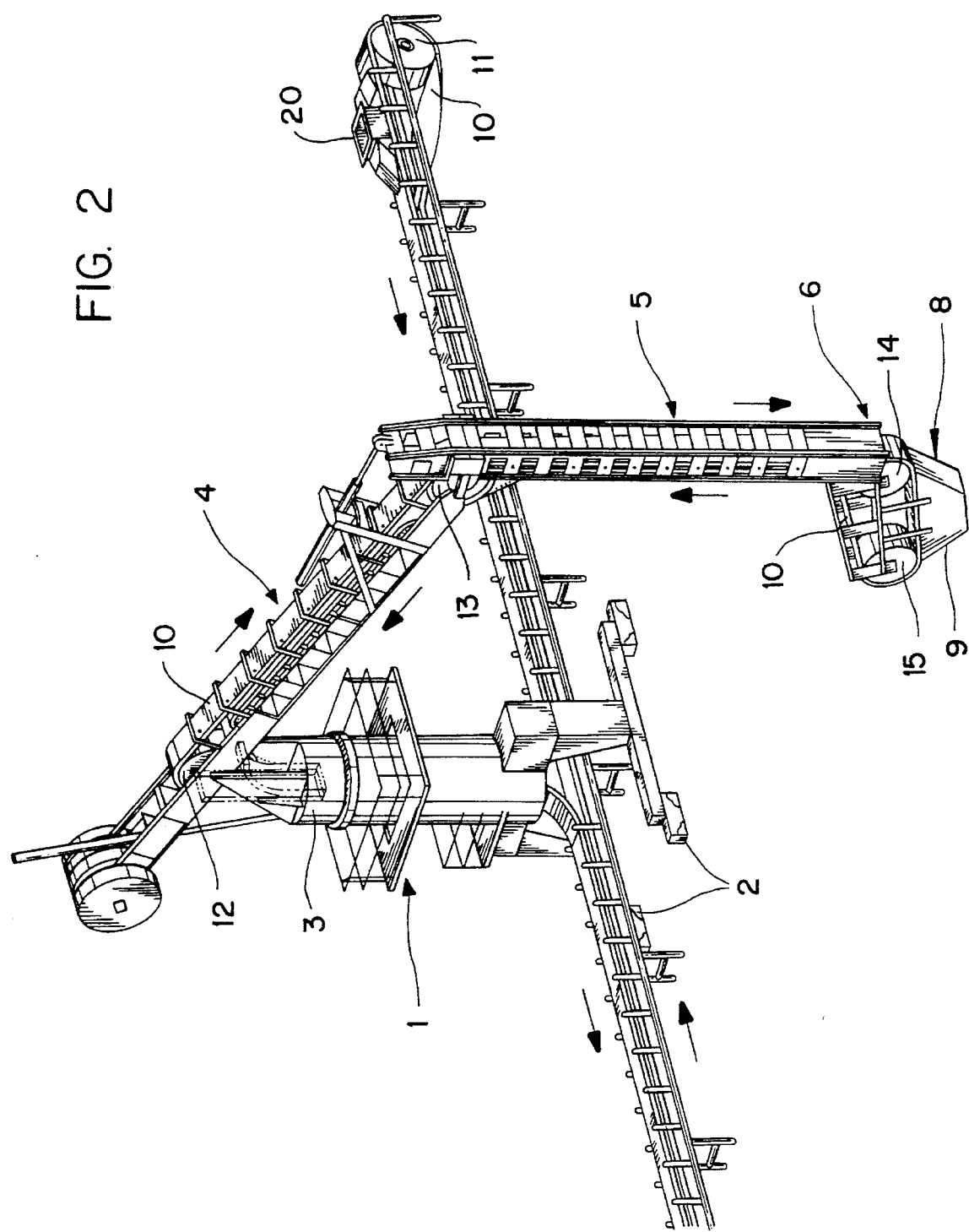
FIG. 2 is a partial perspective view of the conveyor in FIG. 1, here however equipped with a feed-out device instead of a feed-in device.

At the free end of the arm 4, 5 may be mounted a feed-in device 7, e.g. a screw conveyor as in FIG. 1, or a feed-out device 8, e.g. a belt-opening device 9 as in FIG. 2.

According to the invention, an endless conveyor belt 10 passes in closed state over a terminal roller 11 at one end of the path, up to the tower 1, up through the tower 1 while rotating through 90° about its longitudinal axis, over a guide roller 12 whose axis is identical with the pivot axis of the arm section 4 in the upper part 3 of the tower 1, along the arm section 4 out to and over a guide roller 13 whose axis is identical with an axis for the mutual pivotal movement of the arm sections 4, 5, down along the arm section 5 and round two terminal rollers 14, 15 (FIG. 2), between which is arranged the belt-opening device 9, or round a terminal roller 16 (FIG. 1), after which is arranged a belt-opening device 18 associated with a screw conveyor 17 for feeding in the goods.

From the terminal roller 15 or 16, the belt 10 returns along the arm section 5, over the guide roller 13, back along the arm section 4, over the guide roller 12, down through the tower 1 while rotating through 90° about its longitudinal axis and further along the path to a terminal roller 19. From the terminal roller 19, the belt 10 travels along a return path back to the terminal roller 11. A belt-opening device 20 for feeding in the goods and a belt-opening device 21 for feeding out the goods are provided adjacent to the terminal roller 11.

In FIGS. 1 and 2, the direction of travel of the belt 10 is indicated by arrows. Normally, the terminal rollers 11, 19 serve as driving rollers.

The upper part 3 of the tower 1 can be rotatable through 360°, as may also the belt 10 passing up and down through the tower 1. As a result, the goods can be fed in and out on both sides of the path along which the tower 1 moves.

Figure 4:
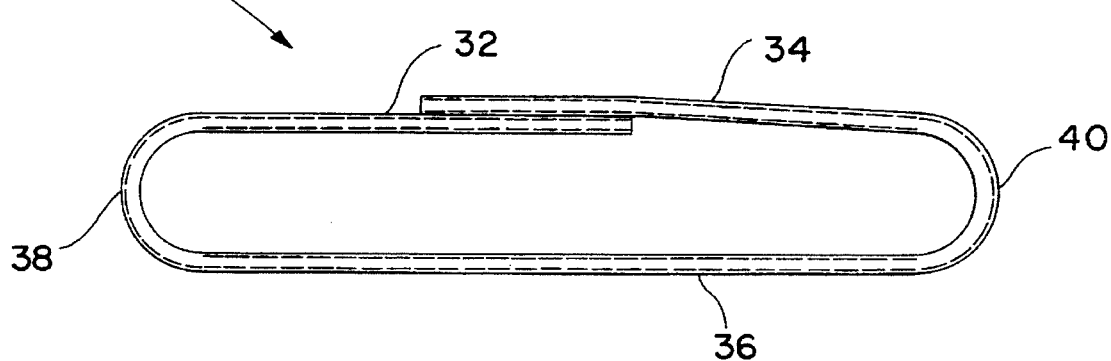
FIG. 4 is a cross-sectional view of the conveyor belt.

The belt 10 may be of the type described in U.S. Pat. No. 5,060,787, i.e. have a planar central part 36 and two planar edge parts 32, 34 which are each hingedly connected to the central part 38, 40 via a hinge part, the central part and the edge parts being flexurally rigid about the longitudinal direction of the belt, and the total width of the edge parts being larger, and the width of the hinge parts being substantially smaller, than the width of the central part as shown in FIG. 4.

Figure 5:
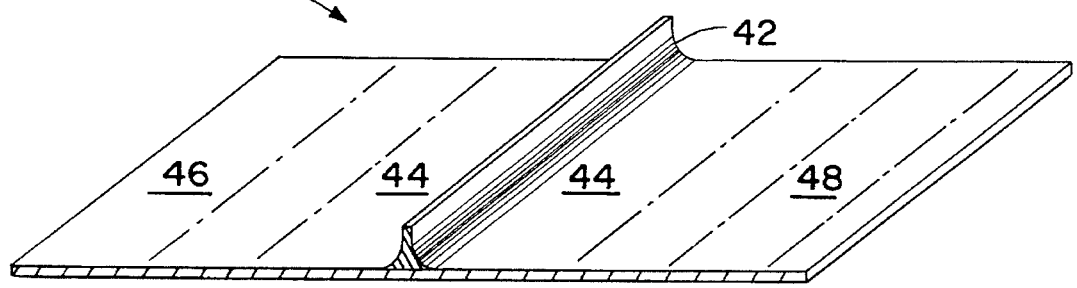
FIG. 5 is a perspective view of a second embodiment of a conveyor belt.
Figure 6:
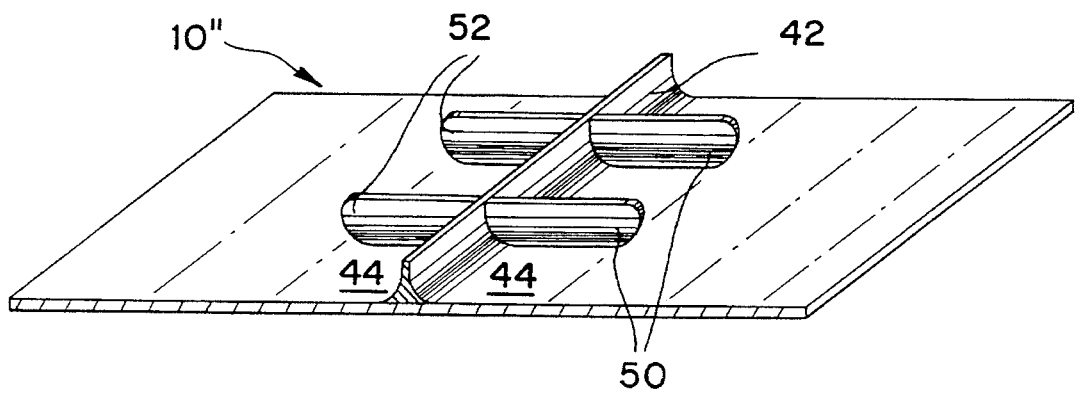
FIG. 6 is a perspective view of a third embodiment of a conveyor belt in the unfolded state.

When the goods to be transported consists of cement or some other easily fluidising material, the belt 10, of FIG. 5 suitably is of the type described in WO 92/12076, i.e. equipped with a longitudinal strip 42 which is fixedly connected to one side of the central part 44 and projects upwards therefrom and which is located in the overlapping area of the edge parts 46, 48. As shown in FIG. 6, optional, driver strips can be fixedly connected to the central part 44 and the longitudinal strip 42 in a third embodiment of the belt 10". The driver strips 50, 52 extend from the longitudinal strip 42 at least to a lateral edge of the central part 44.

Figure 7:
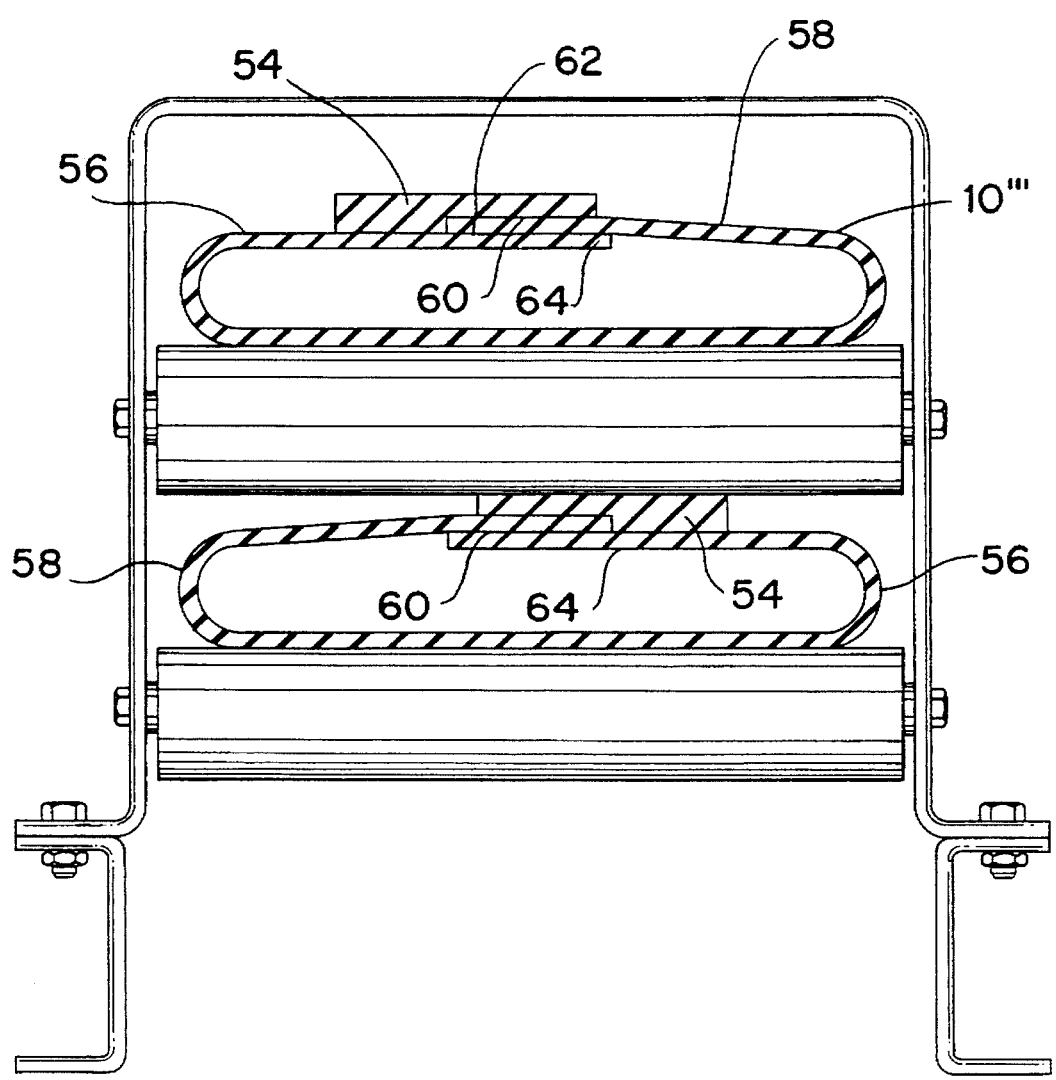
FIG. 7 is a cross-sectional view of a third embodiment of a conveyor belt.

However, the conveyor belt 10" preferably is of the type described in PCT/SE92/00733 and shown in FIG. 7. Two edge parts 56, 58 are provided. One edge part 56 is divided into two sections closest to its free longitudinal edge so as to form a longitudinal pocket 60 which is open towards the free longitudinal edge. Strip 54 and free edge portion 64 of edge part 56 form pocket 60. In this pocket 60 the free edge portion 62 of the other edge part 58 is received substantially non-rotatably and positively retained owing to the connection between the edge parts and the central part.

This embodiment of the conveyor belt 10 is advantageous, in that no belt-guiding means are needed on the upper side of the conveyor belt 10 along its run between the terminal roller 11 and the tower 1 or between the tower 1 and the terminal roller 19. Should such belt-guiding means on the upper side of the conveyor belt be required along this stretch, these means must be raisable from the conveyor belt 10 to enable displacement of the tower 1.

It is to be understood that the driving force exerted on the belt 10 by the terminal rollers 11, 19 has to vary according to the position of the tower. To reduce this variation, a driving belt 22 may, as shown in FIG. 3, be arranged in frictional contact with the belt 10 in the area where this changes from moving towards the tower to moving up along the tower.

Adjusting means 30 may be provided to minimise tractive forces in the belt by varying the distribution of the driving forces applied, at least according to the position of the tower 1 along the path.

Advantageously, the belt 10 may travel through a bend or round a guide roller with the central part on the inside of the bend or in contact with the guide roller. In some positions, the belt 10 may have to rotate through 180° about its longitudinal axis before the bend or the guide roller.

Further modifications of the above embodiments of the inventive conveyor are within the expert's grasp. For instance, the tower 1 need not be arranged immediately above the belt 10 along the path between the terminal rollers 11, 19, but may move along a path parallel to this belt path, in which case the belt 10, after being raised, travels a stretch transversely of the path between the terminal rollers 11, 19.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A conveyor for feeding out or feeding in goods within an elongated area, said conveyor comprising:
    a tower movable along a path located at a long side of the elongated area;
    an arm mounted on the tower and having a free end which extends into said area;
    a feed-out device or a feeding device mounted at the free end of the arm:
        a single endless conveyor belt which is closed but can be opened for feeding out or feeding in the goods;
        belt-guiding means for guiding the conveyor belt from a first terminal point of the path, along this and up to the tower, up along the tower and out along the arm to the feed-out device or the feed-in device, back along the arm and the tower down to the path, further along this to a second terminal point thereof, and in a return path back to the first terminal point; and
        a feed-in or feed-out station arranged at one of the terminal points or at a point along the return path.

2. The conveyor as set forth in claim 1, wherein the belt-guiding means disposed along the path between the terminal points thereof only comprise supporting rollers arranged beneath the conveyor belt.

3. The conveyor as set forth in claim 1, wherein the conveyor belt is driven by a terminal roller at one or both of the terminal points of the path.

4. The conveyor as set forth in claim 3, wherein the belt-guiding means comprise a driven belt (22) which is in frictional contact with the closed conveyor belt in the area where this changes from moving up to the tower to moving up along the tower.

5. The conveyor as set forth in claim 3, further comprising adjusting means for minimising tractive forces in the conveyor belt by varying the distribution of the driving forces applied, at least according to the position of the tower along the path.

6. The conveyor as set forth in claim 1, wherein the belt comprises a planar central part and two planar edge parts which are each hingedly connected to the central part via a hinge part, the central part and the edge parts being flexurally rigid about the longitudinal direction of the belt, and the total width of the edge parts being larger, and the width of the hinge parts being substantially smaller, than the width of the central part.

7. The conveyor as set forth in claim 6, further comprising a longitudinal strip which is fixedly connected to one side of the central part and projects upwards therefrom and which is located in the overlapping area of the edge parts, and, optionally, driver strips which are fixedly connected to the central part and the longitudinal strip and which extend from the longitudinal strip at least to a lateral edge of the central part.

8. The conveyor as set forth in claim 6, wherein one edge part of the conveyor belt is divided into two sections closest to its free longitudinal edge so as to form a longitudinal pocket which is open towards the free longitudinal edge and in which the free edge portion of the other edge part is received substantially non-rotatably and positively retained owing to the connection between the edge parts and the central part.

9. The conveyor as set forth in claim 1, wherein an upper part of the tower is rotatable about a vertical axis.

10. The conveyor as set forth in claim 1, wherein the arm is pivotable in a vertical plane and consists of two sections which are pivotable in relation to one another.

* * * * *